(12) United States Patent
Spanknebel et al.

(10) Patent No.: US 9,973,909 B2
(45) Date of Patent: May 15, 2018

(54) INDIVIDUAL PREDICTION OF USE AND/OR INDIVIDUAL ADAPTATION OF USE OF A PERSONALISED TELECOMMUNICATIONS TERMINAL

(71) Applicant: Deutsche Telekom AG, Bonn (DE)

(72) Inventors: Frank R. Spanknebel, Gross-Gerau (DE); Nicolas Walter Stepanek, Reichelsheim (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days. days.

(21) Appl. No.: 15/079,080

(22) Filed: Mar. 24, 2016

(65) Prior Publication Data

US 2016/0286370 A1   Sep. 29, 2016

(30) Foreign Application Priority Data

Mar. 27, 2015   (DE) .................. 10 2015 205 661

(51) Int. Cl.
  *H04M 3/00*    (2006.01)
  *H04W 4/18*    (2009.01)
  *H04M 1/725*   (2006.01)
  *H04W 8/18*    (2009.01)

(52) U.S. Cl.
  CPC ......... *H04W 4/18* (2013.01); *H04M 1/72569* (2013.01); *H04W 8/18* (2013.01); *H04M 3/00* (2013.01)

(58) Field of Classification Search
  CPC ..... H04W 4/18; H04W 8/18; H04M 1/72569; H04M 3/00

USPC .................... 455/418, 466, 456.4; 705/14.64
See application file for complete search history.

(56) References Cited

U.S. PATENT DOCUMENTS

| 8,346,881 B1* | 1/2013 | Cohen ............... G06Q 10/107 709/203 |
| 8,688,480 B1* | 4/2014 | Singh .................. G06Q 40/08 705/2 |
| 2003/0046421 A1* | 3/2003 | Horvitz ............. G06Q 10/107 709/238 |
| 2008/0091722 A1 | 4/2008 | Wendelrup |

(Continued)

FOREIGN PATENT DOCUMENTS

EP   2677484 A1   12/2013

*Primary Examiner* — Mong-Thuy Tran
(74) *Attorney, Agent, or Firm* — Leydig, Voit & Mayer, Ltd.

(57) ABSTRACT

A method for prediction and/or adaptation of use of a telecommunications terminal includes: detecting, by the telecommunications terminal, use actions by a user carried out via a user interface of the telecommunications terminal and context information of the telecommunications terminal over a predetermined time interval; generating or altering, by the telecommunications terminal, at least one specific rules factor out of a plurality of rules factors based on an occurrence of a first event out of a plurality of events subject to the behavior of the user regarding the use actions carried out via the user interface and/or subject to the context information of the telecommunications terminal; and in case of the occurrence of the first event and/or in case of the occurrence of a second event, applying, by the telecommunications terminal, the at least one generated or altered specific rules factor subject to the context information.

11 Claims, 2 Drawing Sheets

(56) References Cited

U.S. PATENT DOCUMENTS

| | | | |
|---|---|---|---|
| 2008/0098074 A1* | 4/2008 | Hurling | G06F 19/3418 709/206 |
| 2010/0105374 A1 | 4/2010 | Sung et al. | |
| 2010/0205061 A1* | 8/2010 | Karmarkar | G06Q 30/02 705/14.64 |
| 2012/0054022 A1* | 3/2012 | Kosashvili | G06F 17/30867 705/14.43 |
| 2012/0054023 A1* | 3/2012 | Pan | G06Q 30/02 705/14.45 |
| 2012/0115453 A1* | 5/2012 | Zheng | H04M 1/72569 455/418 |
| 2013/0246164 A1* | 9/2013 | Khanna | G06Q 30/0267 705/14.45 |
| 2014/0120961 A1* | 5/2014 | Buck | H04W 4/12 455/466 |
| 2014/0206328 A1 | 7/2014 | Varoglu et al. | |
| 2014/0357247 A1* | 12/2014 | Assuncao | H04M 1/72569 455/418 |
| 2015/0180894 A1* | 6/2015 | Sadovsky | G06F 3/0481 726/22 |
| 2015/0281155 A1* | 10/2015 | Cue | H04L 51/12 715/752 |
| 2016/0205267 A1* | 7/2016 | Vaughn | H04M 19/04 455/566 |
| 2016/0253710 A1* | 9/2016 | Publicover | G06Q 30/02 |
| 2017/0099592 A1* | 4/2017 | Loeb | H04W 4/206 |

\* cited by examiner ized individual prediction of use and/or a correspondingly personalized individual adaptation of use of the telecommunications terminal is possible.

INDIVIDUAL PREDICTION OF USE AND/OR INDIVIDUAL ADAPTATION OF USE OF A PERSONALISED TELECOMMUNICATIONS TERMINAL

CROSS-REFERENCE TO RELATED APPLICATIONS

Priority is claimed to German Patent Application No. DE 10 2015 205 661.9, filed on Mar. 27, 2015, the entire disclosure of which is hereby incorporated by reference herein.

FIELD

The invention relates to a method for the individual prediction of use and/or the individual adaptation of use of a personalised telecommunications terminal, provided for operation by a user.

The invention also relates to a telecommunications terminal for the individual prediction of use and/or the individual adaptation of use by a user.

The invention further relates to a computer program.

BACKGROUND

The use of highly personalised terminals (or of telecommunications terminals) in every conceivable everyday situation and the supply of the most diverse items of information via these terminals is an unstoppable trend. However, a number of new problems which need to be solved on behalf of the operator or user are simultaneously emerging in addition to the many advantages for the customer or user of such telecommunications terminals.

SUMMARY

In an embodiment, the invention provides a method for prediction and/or adaptation of use of a telecommunications terminal. The method includes: detecting, by the telecommunications terminal, use actions by a user carried out via a user interface of the telecommunications terminal and context information of the telecommunications terminal over a predetermined time interval; generating or altering, by the telecommunications terminal, at least one specific rules factor out of a plurality of rules factors based on an occurrence of a first event out of a plurality of events subject to the behavior of the user regarding the use actions carried out via the user interface and/or subject to the context information of the telecommunications terminal; and in case of the occurrence of the first event and/or in case of the occurrence of a second event from the plurality of events, applying, by the telecommunications terminal, the at least one generated or altered specific rules factor subject to the context information of the telecommunications terminal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
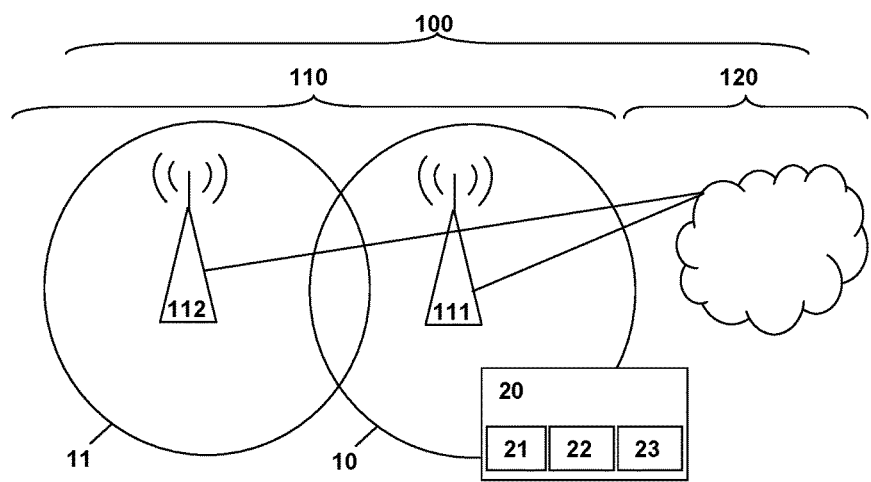
FIG. 1 schematically shows a telecommunications network with an access network, a core network, a plurality of radio cells and a telecommunications terminal according to the invention.

The operator or user of a terminal wants simplification. Embodiments of the invention addresses the question as to how the providers of personalised terminals, in particular operators of telecommunications networks, can make it possible to assist in prioritisation, play-out or identification of information from all kinds of communications channels—for example from conventional telephone calls and/or messages, for example text messages or the like, or also messages from social networks or messages which are generated via other channels, for example by services such as Facebook, Twitter, Whatsapp or the like.

In an embodiment, the invention provides a method for the individual prediction of use and/or the individual adaptation of use of a personalised telecommunications terminal, provided for operation by a user, the telecommunications terminal having a user interface, the telecommunications terminal having a behaviour detection element, both use actions by the user, carried out via the user interface, and context information of the telecommunications terminal being detected by the behaviour detection element so that it is possible to realise more effectively the use or usability and the individual adaptation of the telecommunications terminal to the individual requirements of the operator or user in a manner which can be implemented and configured more easily for the user and to thereby avoid unwanted situations during the interaction between telecommunications terminal and user, i.e. in particular situations in which a user of the telecommunications terminal who, due to incoming or generated messages and items of information which are also indicated to the user by the telecommunications terminal, feels pestered or disturbed particularly by the signalling of the incoming or generated messages or information, or situations in which the user of the telecommunications terminal is also disturbed or annoyed, but this time due to the fact that messages or items of information which are incoming, which have arrived or have been generated by the telecommunications terminal are not indicated or are not indicated to the user satisfactorily (i.e. in a manner detectable by the user) by the telecommunications terminal.

In an embodiment the invention provides for the individual prediction of use and/or the individual adaptation of use of a personalised telecommunications terminal, provided for operation by a user, the telecommunications terminal having a user interface, the telecommunications terminal having a behaviour detection element, both use actions by the user, carried out via the user interface, and context information of the telecommunications terminal being detected by the behaviour detection element, the telecommunications terminal also having a relevance determining element and a plurality of rules factors, a plurality of events being considered and, in the case of the occurrence, at a particular time, of a specific event from the plurality of events, the relevance determining element selects at least one specific rules factor from the plurality of rules factors so that the specific rules factor is applied to the specific event, the method comprising the following steps:

in a first step, on the one hand, the behaviour of the user regarding the use actions carried out via the user interface and, on the other hand, context information of the telecommunications terminal are detected over a predetermined time interval, in a second step, after or during the first step, given the occurrence of a first event from the plurality of events, at least one generated or altered rules factor is generated or altered subject to the behaviour of the user regarding the use actions carried out via the user interface and/or subject to the context information of the telecommunications terminal, in a third step, after the second step, in the case of the occurrence of the first event and/or in the case of the occurrence of a second event from the plurality of events, the generated or altered rules factor is applied subject to the context information of the telecommunications terminal.

It is thus advantageously possible, according to the present invention, for an added benefit to be generated for the customer or user by the use according to the invention of the telecommunications terminal or by the configuration of the telecommunications terminal for the use according to the invention. It is also advantageously possible according to the invention for the simplicity of use of the telecommunications terminal to be enhanced, while still ensuring maximum privacy.

In this respect, the greatest problem lies in identifying which notifications and items of information are most relevant to the customer or user of the telecommunications terminal at the respective time.

The invention advantageously provides that, inter alia, the context of use of the telecommunications terminal (or of the terminal use) and/or the sender of the message or item of information (or other metadata of the arrived or generated message or item of information) and/or the respective content of the message or item of information is evaluated. According to the invention, it is particularly preferred if the context of use of the telecommunications terminal and the sender of the message or item of information (or other metadata of the arrived or generated message or item of information) and the respective content of the message or item of information are evaluated.

In the context of the present invention, reference will frequently be made to the term "an operator" or "the operator" or to the term "a user" or "the user" of the telecommunications terminal. These terms are not to be understood as being restricted to a particular biological gender of the operator or user, but are naturally also to be understood in the sense of including a female operator or female user of the telecommunications terminal.

The use of mobile terminals or of telecommunications terminals by the respective user typically produces a local, persistent personal relevance or relevant information (or a relevance value) which is closely related to the respective terminal or telecommunications terminal for specific messages or items of information which are received or also generated by the telecommunications terminal. A personal relevance of this type (or personal relevant information of this type or a relevance value of this type) can be called intelligent (or "smart") in an individual way, i.e. such a personal relevance (or relevant information or relevance value) is individually and specifically for the use of the respective telecommunications terminal by the respective user. In this context, "intelligent" or "smart" is to be understood as meaning that the importance to be assigned to the (incoming or generated) message or item of information, for the customer (or for the user of the telecommunications terminal) arises firstly from the context of the current terminal use of the telecommunications terminal and/or from further meta-information of the (incoming or generated) message or item of information, for example from the social position of the user of the telecommunications terminal relative to the sender of the message and/or from the personal profile and/or from the customer's preferences and/or from the message content. According to the invention, it is particularly preferred if the importance to be assigned to the message or item of information for the customer arises from the context of the current terminal use of the telecommunications terminal and also from further meta-information of the (incoming or generated) message or item of information, and also from the personal profile and/or from the customer's preferences, and also from the message content. According to the invention, it is also preferably provided that the importance to be assigned to the (incoming or generated) message or item of information for the customer (or for the user of the telecommunications terminal) is dynamically adapted by the user behaviour. The components adapting to the customer's requirements can communicate with those preferred by the customer and from third party services so that it is possible to prioritise the messages according to relevance.

In the context of the present invention, the term "telecommunications terminal" includes an electrical or electronic device which is preferably used by an individual person and which has at least one communications interface, the at least one communications interface being a short-range communications interface, i.e. for transmitting data over relatively short distances, or a wide-area communications interface, i.e. a communications interface for transmitting data over relatively great distances. A telecommunications terminal within the meaning of the present invention is in particular an electrical or electronic device which is used by an individual person or is provided for use by an individual person and thus is not used by several people, or it is "shared" by several people in that a first person uses the telecommunications terminal at a first point in time or during a first time interval and a second person uses the telecommunications terminal at a second point in time or during a second time interval, the first and second points in time or the first and second time intervals being provided repetitively. In the case of a telecommunications terminal within the meaning of the present invention, a communications interface is provided in the sense of a short-range communications interface, for example to realise local, short-range radio connections, for example over distances of 1 millimeter to 1000 meters. In the case of a telecommunications terminal within the meaning of the present invention, a communications interface is provided in the sense of a wide-area communications interface, for example to realise wide-area connections, in particular mobile radio connections, for example over distances of more than 1 meter. Examples of communications interfaces for short-range radio connections are communications interfaces according to one variant or according to a plurality of variants of the Bluetooth standard, according to the WLAN standard, according to one variant or according to a plurality of variants of the NFC standard (near field communications) etc. Examples of wide-area communications interfaces are communications interfaces according to a mobile radio access technology, such as a second generation mobile radio access technology (2G, GSM, Global System for Mobile Communications), a third generation mobile radio access technology (3G, UMTS, Universal Mobile Telecommunications System), a fourth generation mobile radio access technology (4G, LTE, Long Term Evolution) or one of the successor technologies. The at least one communications interface present in a telecommunications terminal according to the present invention can also be configured such that more than one communications interfaces are present, in particular two communications interfaces, in particular a short-range communications interface and a wide-area communications interface. Furthermore, the invention preferably provides that the telecommunications terminal has more than one short-range communications interface and/or more than one wide-area communications interface. If the telecommunications terminal has a wide-area communications interface, according to the invention it is preferred that the telecommunications terminal is configured accordingly, in particular that it has one identification module or a plurality of identification modules, for example in the sense of one or more SIM modules (Subscriber Identity Module) or in the sense of one or more eSIM modules (embedded Subscriber Identity Module).

According to the invention, it is provided that for the individual prediction of use and/or the individual adaptation of use of a personalised telecommunications terminal, provided for operation by a user, various data are generated or acquired, such data which reflect the use of the telecommunications terminal being primarily or even exclusively stored in the telecommunications terminal, i.e. in a storage device of the telecommunications terminal or in a storage device associated with the telecommunications terminal. Consequently, it is advantageously possible to gain an improvement in the level of respect of privacy or data protection of the user of the telecommunications terminal. The data which reflect the use of the telecommunications terminal are generated in particular by the telecommunications terminal. For this purpose, the telecommunications terminal has in particular a user interface and a behaviour detection element, said behaviour detection element detecting, on the one hand, use actions of the user carried out via the user interface and, on the other hand, context information of the telecommunications terminal. The telecommunications terminal also has a relevance determining element and a plurality of rules factors, a plurality of events being considered. According to the invention, in the case of the occurrence, at a particular time, of a specific event from the plurality of events, the relevance determining element selects at least one specific rules factor from the plurality of rules factors so that the specific rules factor (or the rules) is/are applied to the specific event. Here, it is preferred according to the invention if the method is carried out such that the use actions are recorded or detected continuously by the behaviour detection element, so that the relevance determining element can continuously optimise the rules factors, so that not only is an ever better adaptation to an individual use of the telecommunications terminal possible, which use is initially interpreted statistically, but the relevance determining element with the rules factors can also be adapted to a use of the telecommunications terminal by the user which changes during a particular passage of time.

According to the invention, for this purpose it is provided that in the first step of the method, on the one hand, the behaviour of the user regarding the use actions carried out via the user interface and, on the other hand, context information of the telecommunications terminal are detected over a predetermined time interval. According to the invention, it is thus advantageously possible that correlations between, on the one hand, specific present context information of the telecommunications terminal (for example regarding the time of an event and/or regarding the current location of the telecommunications terminal (for example also regarding the location relative to another telecommunications terminal or to another stationary or mobile device) and/or regarding the speed of the telecommunications terminal and/or regarding the background noise and/or regarding the information content of a phonebook memory and/or of a message store and/or of a calendar memory of the telecommunications terminal) and, on the other hand, the use actions carried out via the user interface can be deduced. The predetermined time interval comprises the period of time within which the relevance determining element adapts the rules factors, and these are thus changeable or are changed. According to the invention, it is advantageously possible that the predetermined time interval corresponds to a creative use time period (of for example one minute or 5 minutes or 10 minutes or 15 minutes or 30 minutes or one hour or two hours or 6 hours or 12 hours or 24 hours or 48 hours or 72 hours or one week or two weeks or four weeks or one month or two months or three months or 6 months or 12 months), and during the creative use time period, the rules factors are adapted or altered and the creative use time period (or the predetermined time interval) is followed by a non-creative use time period during which the rules factors are no longer adapted or altered. As an alternative to a two-step procedure of this type (i.e. during the predetermined time interval or the creative use time period, the rules factors are adapted or altered and during the following non-creative use time period, no such adaptation or alteration is carried out), according to the invention it is also preferably provided and advantageously possible that the predetermined time interval or the creative use time period of the telecommunications terminal extends over the entire use time period (and thus a non-creative use time period is not provided), or that the predetermined time interval or the creative use time period of the telecommunications terminal extends over a particular time (of, for example, one minute or 5 minutes or 10 minutes or 15 minutes or 30 minutes or one hour or two hours or 6 hours or 12 hours or 24 hours or 48 hours or 72 hours or one week or two weeks or four weeks or one month or two months or three months or 6 months or 12 months), which is then followed by a non-creative use time period, also for a particular time (of, for example, one minute or 5 minutes or 10 minutes or 15 minutes or 30 minutes or one hour or two hours or 6 hours or 12 hours or 24 hours or 48 hours or 72 hours or one week or two weeks or four weeks or one month or two months or three months or 6 months or 12 months). In the second method step, after or during the first step, in view of the occurrence of a first event from the plurality of events, at least one generated or altered rules factor is generated or altered subject to the behaviour of the user regarding the use actions carried out via the user interface and/or subject to the context information of the telecommunications terminal. Thus, the second method step takes place during the predetermined time interval or during the creative use time period or substantially directly thereafter. In the third method step, after the second step (i.e. after or during the creative use time period), in the case of the occurrence of the first event and/or in the case of the occurrence of a second event from the plurality of events, the generated or altered rules factor is applied subject to the context information of the telecommunications terminal. As mentioned, according to the invention it is provided that the behaviour detection element and the relevance determining element with the rules factors are part of the telecommunications terminal and thus a high level of data security and data protection is provided for the user of the telecommunications terminal.

However, according to the invention, it is also preferred that the behaviour detection element has first configuration data, that the relevance determining element has second configuration data and that the plurality of rules factors has third configuration data, the first, second and third configuration data being stored in the telecommunications terminal. In particular, this means that in order to implement the method according to the invention, no user-based data whatsoever, in particular no context information as part of the first configuration data of the behaviour detection element, have to be transmitted from the telecommunications terminal to a server device.

Consequently, according to the invention it is advantageously possible that a high level of data security and data protection can be realised for the user of the telecommunications terminal.

According to the invention, it is further preferred that the telecommunications terminal has at least one signal transmitter, and from applying the various rules factors from the plurality of rules factors, there results:

the activation and/or intermittent activation, and/or the partial activation and/or intermittent partial activation, and/or the deactivation and/or intermittent deactivation of the at least one signal transmitter.

As a result, according to the invention, it is advantageously possible that the activation and/or the intermittent activation or the deactivation and/or the intermittent deactivation or the partial activation and/or the intermittent partial activation of the signal transmitter or also of the plurality of signal transmitters of the telecommunications terminal can be adapted to the preferences of the user of the telecommunications terminal. Here, in particular optical, acoustic, haptic and/or olfactory signal transmitters are provided as signal transmitters.

It is also preferred according to the invention that a plurality of operating modes of the telecommunications terminal is detected due to the detection, via the behaviour detection element, of use actions by the user carried out via the user interface and of context information of the telecommunications terminal.

Thus, according to the invention, it is advantageously possible that a particularly flexible use and a particularly good adaptation of the behaviour of the telecommunications terminal to the user's needs is made possible, namely without involving a great amount of configuration effort for the user.

According to the invention, it is also further preferred that the telecommunications terminal has a plurality of sensors, the context information being acquired by the plurality of sensors and the plurality of sensors having in particular a chronometer and/or a receiver for the use of a global navigation satellite system (GNSS) and/or a localisation sensor based on the evaluation of the radio environment of the telecommunications terminal and/or an inertial sensor, in particular an acceleration sensor, and/or a microphone, the context information particularly comprising:

the time of an event, and/or the location of the telecommunications terminal, in particular the location of the telecommunications terminal relative to another telecommunications terminal and/or relative to another stationary or mobile device, and/or the speed of the telecommunications terminal, and/or the background noise of the telecommunications terminal, and/or the information content of a phonebook memory and/or of a message memory and/or of a calendar memory of the telecommunications terminal.

As a result, according to the invention it is advantageously possible for the context information to be determined in a particularly precise manner, so that the rules factors can be defined and determined particularly accurately and are adapted to the respective situation of use.

Furthermore, it is also preferred according to the invention that the telecommunications terminal has a targeting element, said targeting element intercepting targeting information which is explicitly released by the user of the telecommunications terminal, the targeting information being part of the context information.

Consequently, according to the invention, it is advantageously possible that the individual prediction of use and/or the individual adaptation of use of the telecommunications terminal also includes the field of advertising transmitted to the user of the telecommunications terminal.

According to the invention, it is also advantageously preferred for the plurality of rules factors to have a first subset of rules factors and a second subset of rules factors, the first subset of rules factors comprising automatically generated or altered rules factors and the second subset of rules factors comprising rules factors defined by the user of the telecommunications terminal.

Thus, according to the invention, it is advantageously possible for particular rules factors (namely the rules factors of the first subset) to be at least initially predetermined, i.e. during a first use time period, as a standard of rules factors and for the rules factors of the second subset to be generated on an individual user basis.

According to the invention, it is also preferred for the plurality of events to have a first subset of events and a second subset of events, the first subset of events comprising incoming messages for the user of the telecommunications terminal and the second subset of events comprising advertising messages and/or information offers.

The present invention also relates to a telecommunications terminal for the individual prediction of use and/or the individual adaptation of use by a user, the telecommunications terminal having a user interface, the telecommunications terminal having a behaviour detection element, the telecommunications terminal being configured such that both use actions by the user, carried out via the user interface, and context information of the telecommunications terminal are detected by the behaviour detection element, the telecommunications terminal also having a relevance determining element and a plurality of rules factors, the telecommunications terminal being configured such that a plurality of events is considered, the telecommunications terminal being further configured such that in the case of the occurrence, at a particular time, of a specific event from the plurality of events, the relevance determining element selects at least one specific rules factor from the plurality of rules factors so that the specific rules factor is applied to the specific event, the telecommunications terminal being configured such that:

on the one hand, the behaviour of the user regarding the use actions carried out via the user interface and, on the other hand, context information of the telecommunications terminal are detected over a predetermined time interval, given the occurrence of a first event from the plurality of events, at least one generated or altered rules factor is generated or altered subject to the behaviour of the user regarding the use actions carried out via the user interface and/or subject to the context information of the telecommunications terminal, and in the case of the occurrence of the first event and/or in the case of the occurrence of a second event from the plurality of events, the generated or altered rules factor is applied subject to the context information of the telecommunications terminal.

According to the invention, it is advantageously possible using a telecommunications terminal of this type to realise aspects and advantages described above, with reference to the method according to the invention. According to the invention, it is particularly advantageously possible that the behaviour detection element and the relevance determining element with the rules factors are part of the telecommunications terminal and thus there is a high level of data security and data protection for the user of the telecommunications terminal.

However, according to the invention, with regard to the telecommunications terminal, it is also preferred that the behaviour detection element has first configuration data, that the relevance determining element has second configuration data and that the plurality of rules factors has third configuration data, the first, second and third configuration data being stored in the telecommunications terminal.

Consequently, according to the invention it is advantageously possible for a high level of data security and data protection to be realised for the user of the telecommunications terminal.

According to the invention, it is also preferred that the telecommunications terminal has at least one signal transmitter, and from applying the various rules factors from the plurality of rules factors, there results:

the activation and/or intermittent activation, and/or the partial activation and/or intermittent partial activation, and/or the deactivation and/or intermittent deactivation of the at least one signal transmitter.

As a result, according to the invention, it is advantageously possible that the activation and/or the intermittent activation or the deactivation and/or the intermittent deactivation or the partial activation and/or the intermittent partial activation of the signal transmitter or also of the plurality of signal transmitters of the telecommunications terminal can be adapted to the preferences of the user of the telecommunications terminal. Here, in particular optical, acoustic, haptic and/or olfactory signal transmitters are provided as signal transmitters, particularly in the form of illumination devices or indication devices (for example including individual light diodes, LEDs, or displays in the form of, for example, TFT displays (thin film transistor displays) or also in the form of or comprising OLEDs (organic light-emitting diodes) and/or in the form of acoustic signal transmitters, such as loudspeakers, and/or in the form of haptic signal transmitters, such as vibration actuators.

Furthermore, according to the invention it is also preferred that the telecommunications terminal has a plurality of operating modes of the telecommunications terminal, the telecommunications terminal being configured such that the plurality of operating modes is detected due to the detection, via the behaviour detection element, of use actions by the user carried out via the user interface and of context information of the telecommunications terminal.

Thus, according to the invention, it is also advantageously possible regarding the telecommunications terminal according to the invention that a particularly flexible use and a particularly good adaptation of the behaviour of the telecommunications terminal to the user's needs is enabled, namely without a great amount of configuration effort for the user.

According to the invention, it is also further preferred that the telecommunications terminal has a plurality of sensors, the telecommunications terminal being configured such that the context information is acquired by the plurality of sensors and the plurality of sensors has in particular a chronometer and/or a receiver for the use of a global navigation satellite system (GNSS) and/or a localisation sensor based on the evaluation of the radio environment of the telecommunications terminal and/or an inertial sensor, in particular an acceleration sensor, and/or a microphone, the context information particularly comprising:

the time of an event, and/or the location of the telecommunications terminal, in particular the location of the telecommunications terminal relative to another telecommunications terminal and/or relative to another stationary or mobile device, and/or the speed of the telecommunications terminal, and/or the background noise of the telecommunications terminal, and/or the information content of a phonebook memory and/or of a message memory and/or of a calendar memory of the telecommunications terminal.

As a result, according to the invention it is advantageously possible, also with regard to the telecommunications terminal, for the context information to be determined in a particularly precise manner, so that the rules factors can be defined and determined particularly accurately and are adapted to the respective situation of use.

The present invention also relates to a computer program having processor-executable instructions, using which it is possible to implement the steps of the method according to the invention if the computer program is executed on a programmable device, particularly on a programmable telecommunications terminal.

The present invention further relates to a computer program product having a computer-readable medium and a computer program having processor-executable instructions, stored on the computer-readable medium, which are capable of implementing the steps of the method according to the invention if the computer program is executed on a programmable device, particularly on a programmable telecommunications terminal.

Further details, features and advantages of the invention will become apparent from the drawings and from the following description of preferred embodiments with reference to the drawings. In this respect, the drawings merely illustrate exemplary embodiments of the invention which do not restrict the fundamental inventive concept.

The present invention is described with reference to particular embodiments and with reference to the accompanying drawings, although the invention is not restricted to these embodiments and drawings, but is defined by the claims. The drawings are not restrictive. In the drawings, for illustration purposes, particular elements may be shown enlarged or exaggerated and not true to scale.

Unless specifically indicated otherwise, the use of an indefinite or definite article with reference to a word in the singular, for example "a", "an", "the" also includes the plural of such a word. The terms "first", "second" etc. in the description and in the claims are used to differentiate between similar elements or between the same elements which are to be distinguished from one another and are not necessarily to describe a time sequence or another sequence.

The terms used thus are basically to be considered as interchangeable under appropriate conditions.

FIG. 1 schematically shows a telecommunications network 100 in the form of a cellular telecommunications network or mobile phone network. The telecommunications network 100 has an access network 110 and a core network 120, the access network 110 having a plurality of radio cells, a first radio cell 10 and a second radio cell 11 being shown schematically in FIG. 1. FIG. 1 also schematically shows a telecommunications terminal 20 according to the invention. FIG. 1 also schematically shows a first base station 111 and a second base station 112.

Figure 2:
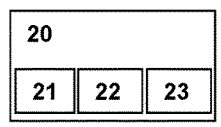
FIG. 2 schematically shows a telecommunications terminal according to the invention.

FIG. 2 schematically shows a telecommunications terminal 20 according to the invention. The telecommunications terminal 20 has a behaviour detection element 21, a relevance determining element 22 and a plurality of rules factors 23.

According to the present invention, it is advantageously possible for an added benefit to be generated for the customer or user by the use according to the invention of the telecommunications terminal or by the configuration of the telecommunications terminal for the use according to the invention. It is also advantageously possible according to the invention for the simplicity of use of the telecommunications terminal to be enhanced, while still ensuring maximum privacy.

In this respect, the greatest problem lies in identifying which notifications and pieces of information are most relevant to the customer or user of the telecommunications terminal at the respective time.

According to the invention, it is advantageously provided that a relevance prioritisation is carried out based on, inter alia, the context of the use of the telecommunications terminal 20 and/or the sender of a message and/or the respective content of the message. This is in contrast with previously known methods in which a sequential listing of notifications and information is usually realised within operating systems established for telecommunications terminals and for mobile devices, without carrying out a prioritisation and without considering the associated relevance to the recipient of the message. For example, notifications are collected on a special page or in a special section, such as on a lock screen or in a status bar (also known as a "notification bar") or in the form of a pop-up window or a pop-up message or in an application. Although the notifications are played out to the user or indicated to him in this way, this is without prioritisation and without the operating system having a prioritisation option.

According to the present invention, it is advantageously possible to realise an individual prediction of the use or an individual adaptation of the use of a telecommunications terminal 20 in that the behaviour detection element 21 and the relevance determining element 22 are used in the telecommunications terminal 20. In the following, the behaviour detection element 21 and the relevance determining element 22 are also called a "self-learning behavioural engine". Consequently, according to the invention, it is advantageously possible to indicate to the customer or to provide the customer with information or with location based services and app recommendations in the right place, at the right time and particularly at the right moment, i.e. at a moment when the user actually wants to see such information. According to the invention, it is particularly advantageous that, for example, with targeting, different types of information can be prioritised with the context of the recipient (i.e. the user), in which case according to the invention it is unnecessary to transfer the rules applied thereto and the underlying data, such as user preferences and relevance probability, from the region of the telecommunications terminal to another location (particularly a server device of an advertising provider), i.e. this information does not have to leave the mobile telecommunications terminal (or local terminal). Consequently, a higher level of data protection for the user is provided, in contrast to known methods; in particular, it is unnecessary for personal or critical data to be kept available centrally in mass memories (particularly in such mass memories (for example of advertising companies) outside the range or the control (of the user) of the telecommunications terminal). The prioritisation or relevance classification (i.e. selection/decision) regarding the messages or information to be indicated to the user takes place according to the invention without data protection guidelines being disregarded, since according to the present invention, the relevant data are exclusively processed inside the telecommunications terminal, i.e. in the mobile device and the collected data are thereby known only by the customer (and by his device or by the telecommunications terminal 20). Thus according to the invention, no data are collected, but are only used locally (i.e. in the telecommunications terminal 20) in order to progressively adapt calculation factors.

According to the invention, it is advantageously possible for information, messages, notifications and/or applications (for a user of the telecommunications terminal 20) to be controlled so that, being adapted to the situation and profile of the recipient and considering the content and/or the sender of the message, these are either prioritised or deprioritised or, in further implementation stages, are even held back in time and played out at the right time. According to the invention, it is therefore provided that the telecommunications terminal 20 is enabled by the method according to the invention to react in a personalised manner, i.e. in the sense of a personalised telecommunications terminal, in that the relevance of information (and of messages and notifications) is detected and the telecommunications terminal 20 can obtain or determine the appropriate location and the right time for the play-out of the information based on the above-mentioned criteria. Here, according to the invention it is provided that the relevance of information (and of messages and notifications) is established based on probabilities. The basis for this is provided by an individual user system of context-based, profile-based, social and content-based rules.

Figure 3:
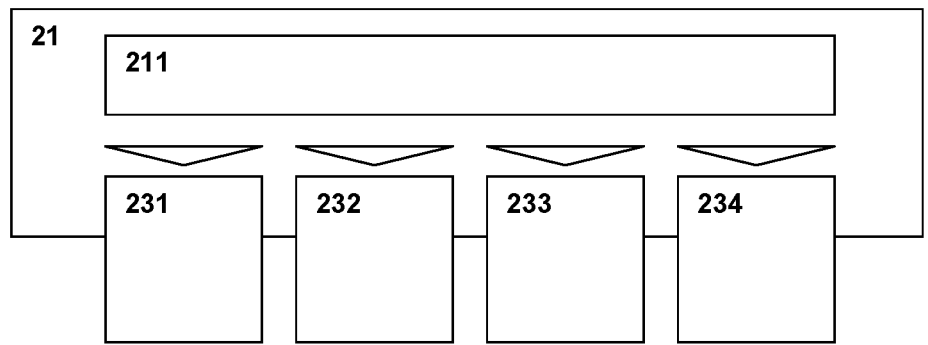
FIG. 3 schematically shows a behaviour detection element for a telecommunications terminal according to the present invention.

FIG. 3 schematically shows a behaviour detection element 21 for a telecommunications terminal 20 according to the invention. The behaviour detection element 21 comprises a behaviour element 211 which, in the following, is also called a behavioural framework and is concerned with the use of notifications (and messages), actions (particularly by the user of the telecommunications terminal) and with the searched Internet pages (browsing history). The relevance values of the various rules are thereby determined in real time. According to the invention, the rules or rules factors can be differentiated into context rules 231, profile rules 232, social rules 233 and content rules 234. Here, for example, context rules 231 comprise the time zone of the telecommunications terminal 20, the location of the telecommunications terminal 20, the speed of the telecommunications terminal 20, the camera image of the telecommunications terminal 20, and/or the ambient noise of the telecommunications terminal 20. Furthermore, profile rules 232 comprise, for example, the personal preferences of the user of the telecommunications terminal 20 and/or the target group determination. Furthermore, social rules 233 comprise in particular the contacts which are present or stored in the telecommunications terminal 20, the communications channels used and/or the persons in the surroundings of the telecommunications terminal 20. Furthermore, content rules 234 comprise the content of the notification or message, the information content, the content of a third party provider and/or the content of an application (app).

Figure 4:
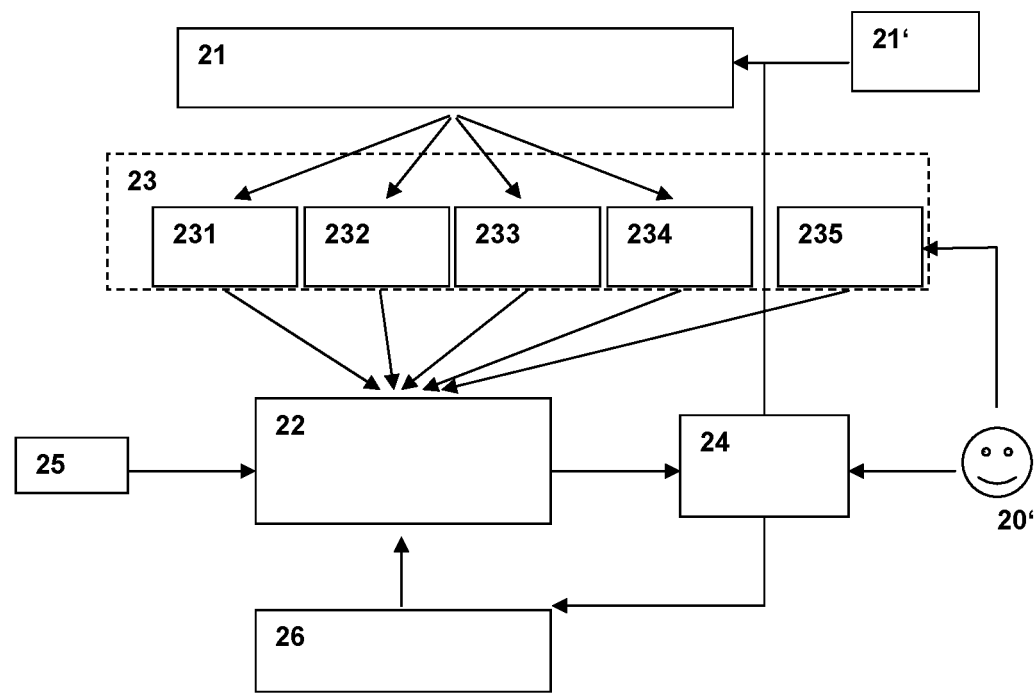
FIG. 4 schematically shows a block diagram of the behaviour detection element, the relevance determining element and the rules factors for a telecommunications terminal according to the invention.

FIG. 4 schematically shows a block diagram of the behaviour detection element 21, the relevance determining element 22 and the rules factors 23 for a telecommunications terminal 20 according to the invention. In the case of an event 25, for example an incoming message or an item of information generated by the telecommunications terminal 20, said event is detected by the relevance determining element 22, or an item of information or a message (concerning the event) is transmitted to the relevance determining element 22. The handling of the event 25 is determined by the relevance determining element 22, for example the output of an item of visual information on a display device 24 of the telecommunications terminal 20 or a vibration signal or an acoustic signal. According to the invention, the event 25 is handled subject to rules or rules factors 23 which are or have been generated in particular based on the temporally earlier behaviour of a user 20' of the telecommunications terminal 20. According to the invention, to generate such rules or rules factors 23, it is provided that the user reaction to a temporally earlier handling of earlier events, during a predetermined time interval and during the first method step, was detected by the behaviour detection element 21 and this user reaction was filed in the form of rules or rules factors 23. According to the invention, the rules or rules factors can be differentiated into context rules 231, profile rules 232, social rules 233 and content rules 234, and veto rules 235 are also added which are generated or created directly by the user 20' of the telecommunications terminal 20. In the behaviour detection element 21, the user reactions to temporally earlier events are primarily used to generate the rules or rules factors 23, although other sources 21' (such as phonebook entries, contact lists etc.) are also provided according to the invention to generate the rules or rules factors 23. Furthermore, according to the invention, it is provided that the event 25 is handled subject to information (targeting information) from a targeting element 26 (in the following, also called a "targeting engine"). Here, it is also provided that the user reaction (or also a user action, for example a user action in a browser program) was detected on a rule basis in the targeting element 26 and a handling procedure (probably) required by the user 20' is indicated.

Thus, according to the invention, a behaviour detection element 21 (behavioural framework engine, BFE) is realised which [ . . . ] information about the behaviour of the user 20' of the telecommunications terminal 20, such as whether and when the user 20' has read or deleted a message, or has taken or cancelled a call, has called back or replied in writing on Whatsapp, for example. Furthermore, the behaviour detection element 21 (or the BFE) receives information from other sources 21', such as from contact lists, phonebook entries and calendar entries in the device but also from similar external information sources which allow a connection. The behaviour detection element 21 or the BFE also uses information about time, location, speed, background noise etc. of the telecommunications terminal 20. In summary, these correspond to the rules or rules factors and to preferences set by the user 20' in order to dynamically alter the rules factors and to continuously adapt them to the behaviour of the user 20'. The generated rules factors 23 are handling rules, individually adapted to the user 20', for events. If rules factors 23 to be (potentially) applied contradict one another, i.e. if a first rules factor to be optionally applied indicates a first handling of an event, while a second rules factor which is also optionally to be applied indicates a second handling (which differs from the first handling or even contradicts it), the rules factors to be applied are weighted or prioritised, so that based on the weighting or prioritisation, a decision can be made about the rules or rules factor to be applied and the event can be handled. The rules factors 23 are divided into two different groups, namely those which are continuously adapted by the behaviour detection element 21 (or BFE), subject to the behaviour of the user 20', and those which are set by the user 20' as veto rules 235 (veto rules factors). Said veto rules are important if the user 20' would always and immediately like an indication or an acoustic signal informing him about all calls and messages from a person, regardless of what he is doing at the time.

According to the invention, events are, for example, messages such as Whatsapp messages, SMS (Short Message System) messages, Facebook messages, telephone calls etc. which are sent to the telecommunications terminal 20 (or to the mobile device) and which, during conventional processing, are normally all indicated or signalled in another way directly and without being assessed, i.e. regardless of whether the user 20' wants to or can see or hear these messages at this time.

Furthermore, according to the invention, the relevance determining element 22 is provided, through which the decisions about the handling of the events are made and which, in the following, is also called a relevance engine. The relevance determining element 22 receives the events for assessment and uses the rules or rules factors 23 to decide whether these events should be displayed to the user 20': directly or later on, as well as the display type thereof: foreground, background, silent or with sound, no vibration or with vibration or simple and repetitive. According to the present invention, the relevance determining element 22 also performs a second task: it receives (from the targeting element 26) advertising messages and app offers for assessment and decides whether they are to be forwarded to the user 20'. This task is performed by the relevance determining element 22 analogously to the events subject to a plurality of rules or rules factors 23.

According to the invention, all these procedures take place inside the telecommunications terminal 20 i.e. in the user's device, and the rules or rules factors are not forwarded to server devices of a provider or to server devices of the provider's partners. As a result, according to the invention, a high level of convenience is obtained in the signalling of messages and events (i.e. both in respect of the signalling of messages which are normally present or are incoming (normal event indication) and in respect of advertising messages and information offers. In particular such advertising messages and information offers are thereby no longer considered to be annoying by the user 20'; instead they generate an added benefit as they are relevant or are considered to be relevant because they are only shown when they are highly likely to be appropriate, based on the prediction of the preferred use of the telecommunications terminal by the user. Furthermore, according to the invention, the targeting element 26 (targeting engine) is present. This element is generally installed in other applications (apps) used by the user, and does not necessarily have to be implemented locally on the telecommunications terminal 20, for example in the browser, in location based services etc. The targeting engine 26 can intercept information which is explicitly released by the user 20', such as the location of the telecommunications terminal 20 or also in places in which the user usually has no other choice than to release the information, for example in the case of surfing behaviour, cookies etc. According to the invention, the targeting engine 26 then uses this information to display to the user 20' offers and other types of advertising.

In the following, different cases of use of the present invention are presented: An application (app) with the functionality according to the invention is installed on the telecommunications terminal 20, the application gaining access to at least one of the following sensors of the telecommunications terminal 20 and to the information stored there: the GPS sensor or GPS receiver, time and date, camera, microphone, monitor or display device, calendar entries, phonebook or contents and contacts stored therein, user behaviour, for example the reading of particular messages. Furthermore, the app realising the functionality according to the invention could gain access, via a Cloud connection or via other connection options, to: the calendar entries in the Cloud and/or other calendars such as the Outlook calendar or the like and/or email inboxes and in particular email contacts. The app realising the functionality according to the invention uses the above-mentioned accesses to learn from the user 20' or to detect the different apps installed on the telecommunications terminal 20 and to derive therefrom profiles and preferences.

First Example of Use

The customer of the telecommunications terminal 20 goes to a fitness studio to take part in sport; the app receives the GPS signals and locates the telecommunications terminal 20; an online comparison (for example on Google maps) shows the app that the user is in, or is in the vicinity of, a fitness studio; if possible, the app compares this information with the user's calendar entries; if they match, the app learns that the user is taking part in sport; the rules or rules factors are changed accordingly in order to take this information into consideration. Optionally or in addition, the app could set/store a training day for the location, this training day automatically sets the rules every time and can be adapted differently and proprietarily by the user; otherwise, "Training" is simply stored as a defined event if the customer is frequently on site and it can be automatically assumed or learnt that the user trains regularly. The relevance determining element 22 of the app uses or reacts dynamically to the change of rules and alters the corresponding settings of the telecommunications terminal 20: the telecommunications terminal 20 is automatically set, for example to "do not disturb"; from the contact list, the contents of emails, Whatsapp messages and SMS messages and user classifications, the app learns to classify the contacts and events depending on urgency; making contact is handled in different ways subject to urgency, for example messages from family members can be given higher priority than messages from colleagues; here, it can be provided that "second calls" (i.e. calls from the same person or telephone number which are re-made within a particular period of time) or calls which suggest an urgent context (for example "injured") are immediately forwarded or signalled to the user; non-urgent messages, such as making contact, are deferred and are only displayed after the user has left the fitness studio or after the passage of a predetermined length of time;

Although the user had been searching for cars on the browser of the telecommunications terminal 20 before he entered the fitness studio and consequently the targeting element 26 wants to send car advertisements to the telecommunications terminal 20, these are not delivered in the "Training" context by the relevance determining element 22. Further (optional) possibilities according to the invention include, for example, the situation in which a family member (for example partner) receives a message when the user of the telecommunications terminal 20 is taking part in sport. The content of a message of this type is, for example, that the user of the telecommunications terminal 20 is taking part in sport, but according to the invention it is provided, for example, that only the family member (for example partner) receives such a message and not another person such as a work colleague, because the information that the user of the telecommunications terminal 20 is taking part in sport, for example, should be of no interest to somebody else.

According to the invention, it is provided that the app realising the functionality according to the invention also detects that the user of the telecommunications terminal is currently in an occupational situation (i.e. at work). This is recognised, for example, in that the user is just then undertaking something in a work context on the telecommunications terminal. The invention ensures that no unnecessary notifications or messages are displayed or indicated, although it allows urgent messages to reach the user, i.e. allows them to be indicated on the telecommunications terminal.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for prediction and/or adaptation of use of a telecommunications terminal, the method comprising:
generating or altering, by the telecommunications terminal, at least one specific rules factor out of a plurality of rules factors based on a detected use action corresponding to the occurrence of a first event and context information corresponding to the first event, wherein the first event is an incoming message event and the detected use action is a user reaction to the first event; and in case of the occurrence of a second event, wherein the second event is also an incoming message event, handling, by the telecommunications terminal, the second event based on the user reaction to the first event, wherein handling the second event comprises applying the at least one generated or altered specific rules factor to the second event based on context information corresponding to the second event;

wherein the telecommunications terminal comprises a plurality of sensors, wherein context information is acquired by the plurality of sensors and the plurality of sensors include a chronometer and/or a receiver for the use of a global navigation satellite system (GNSS) and/or a localization sensor based on the evaluation of a radio environment of the telecommunications terminal and/or an acceleration sensor and/or a microphone; and wherein the context information comprises:
time of an event, and/or
location of the telecommunications terminal relative to another telecommunications terminal and/or relative to another stationary or mobile device, and/or
speed of the telecommunications terminal, and/or
background noise of the telecommunications terminal, and/or
information content of a phonebook memory and/or of a message memory and/or of a calendar memory of the telecommunications terminal.

2. The method according to claim 1, wherein the telecommunications terminal comprises first configuration data, second configuration data, and third configuration data, wherein the first, second and third configuration data are stored in the telecommunications terminal.

3. The method according to claim 1, wherein the telecommunications terminal comprises at least one signal transmitter; and
wherein application of specific rules factors out of the plurality of rules factors causes:
activation and/or intermittent activation of the at least one signal transmitter, and/or
partial activation and/or intermittent partial activation of the at least one signal transmitter, and/or
deactivation and/or intermittent deactivation of the at least one signal transmitter.

4. The method according to claim 1, wherein the telecommunications terminal has a plurality of operating modes based on use actions by the user carried out via the user interface and context information of the telecommunications terminal.

5. The method according to claim 1, further comprising:
intercepting targeting information released by the user of the telecommunications terminal, wherein the targeting information is part of the context information corresponding to the first event.

6. The method according to claim 1, wherein the plurality of rules factors comprises a first subset of rules factors and a second subset of rules factors, the first subset of rules factors comprising automatically generated or altered rules factors and the second subset of rules factors comprising rules factors defined by the user of the telecommunications terminal.

7. A telecommunications terminal for prediction and/or adaptation of use by a user, wherein the telecommunications terminal comprises:
a user interface;
a non-transitory computer-readable medium having processor-executable instructions stored thereon, and a processor, configured to execute the processor-executable instructions to:
generate or alter at least one specific rules factor from a plurality of rules factors based on a detected use action corresponding to the occurrence of a first event and context information corresponding to the first event, wherein the first event is an incoming message event and the detected use action is a user reaction to the first event; and
in case of the occurrence of a second event, wherein the second event is also an incoming message event, handle the second event based on the user reaction to the first event, wherein handling the second event comprises applying the at least one generated or altered specific rules factor to the second event based on context information corresponding to the second event;

wherein the telecommunications terminal further comprises a plurality of sensors configured to acquire context information, wherein the plurality of sensors includes a chronometer and/or a receiver for the use of a global navigation satellite system (GNSS) and/or a localization sensor based on the evaluation of the radio environment of the telecommunications terminal and/or an acceleration sensor and/or a microphone; and wherein the context information comprises:
time of an event, and/or
location of the telecommunications terminal relative to another telecommunications terminal and/or relative to another stationary or mobile device, and/or
speed of the telecommunications terminal, and/or
background noise of the telecommunications terminal, and/or
information content of a phonebook memory and/or of a message memory and/or of a calendar memory of the telecommunications terminal.

8. The telecommunications terminal according to claim 7, wherein the non-transitory computer-readable medium further has first configuration data, second configuration data, and third configuration data stored thereon.

9. The telecommunications terminal according to claim 7, further comprising:
at least one signal transmitter;
wherein the processor is further configured, based on execution of the processor-executable instructions, to apply various specific rules factors from the plurality of rules factors to cause:
activation and/or intermittent activation of the at least one signal transmitter, and/or
partial activation and/or intermittent partial activation of the at least one signal transmitter, and/or
deactivation and/or intermittent deactivation of the at least one signal transmitter.

10. The telecommunications terminal according to claim 7, wherein the telecommunications terminal has a plurality of operating modes corresponding to use actions by the user carried out via the user interface and context information of the telecommunications terminal.

11. A non-transitory, computer-readable medium having processor-executable instructions stored thereon for prediction and/or adaptation of use of a telecommunications terminal, the processor-executable instructions, when executed by a processor, facilitating performance of the following:
generating or altering at least one specific rules factor out of a plurality of rules factors based on a detected use action corresponding to the occurrence of a first event and context information corresponding to the first event, wherein the first event is an incoming message event and the detected use action is a user reaction to the first event; and in case of the occurrence of a second event, wherein the second event is also an incoming message event, handling, by the telecommunications terminal, the second event based on the user reaction to the first event, wherein handling the second event comprises applying the at least one generated or altered specific rules factor to the second event based on context information corresponding to the second event;

wherein the telecommunications terminal comprises a plurality of sensors configured to acquire context information, wherein the plurality of sensors include a chronometer and/or a receiver for the use of a global navigation satellite system (GNSS) and/or a localization sensor based on the evaluation of a radio environment of the telecommunications terminal and/or an acceleration sensor and/or a microphone; and wherein the context information comprises:
- time of an event, and/or
- location of the telecommunications terminal relative to another telecommunications terminal and/or relative to another stationary or mobile device, and/or
- speed of the telecommunications terminal, and/or
- background noise of the telecommunications terminal, and/or
- information content of a phonebook memory and/or of a message memory and/or of a calendar memory of the telecommunications terminal.

* * * * *